United States Patent
Gao et al.

(10) Patent No.: US 10,159,920 B2
(45) Date of Patent: Dec. 25, 2018

(54) SINTERED FE—AL BASED POROUS ALLOY MATERIAL WITH HIGH-TEMPERATURE OXIDIZATION RESISTANCE AND FILTERING ELEMENTS

(71) Applicant: Intermet Technologies Chengdu Co., Ltd., Chengdu, Sichuan (CN)

(72) Inventors: Lin Gao, Chengdu (CN); Tao Wang, Chengdu (CN); Bo Li, Chengdu (CN)

(73) Assignee: Intermet Technologies Chengdu Co., Ltd., Chengdu, Sichuan (CN)

( * ) Notice: Subject to any disclaimer, the term of this patent is extended or adjusted under 35 U.S.C. 154(b) by 86 days.

(21) Appl. No.: 14/908,467

(22) PCT Filed: Jun. 30, 2014

(86) PCT No.: PCT/CN2014/081162
§ 371 (c)(1),
(2) Date: Mar. 23, 2016

(87) PCT Pub. No.: WO2015/014190
PCT Pub. Date: Feb. 5, 2015

(65) Prior Publication Data
US 2016/0220933 A1   Aug. 4, 2016

(30) Foreign Application Priority Data
Jul. 31, 2013  (CN) .......................... 2013 1 0329472

(51) Int. Cl.
| | | |
|---|---|---|
| B01D 39/20 | (2006.01) | |
| B22F 3/11 | (2006.01) | |
| C22C 1/08 | (2006.01) | |
| C22C 33/02 | (2006.01) | |
| C22C 38/18 | (2006.01) | |
| B22F 1/00 | (2006.01) | |
| B22F 5/10 | (2006.01) | |
| C22C 38/06 | (2006.01) | |

(52) U.S. Cl.
CPC ......... *B01D 39/2034* (2013.01); *B01D 39/20* (2013.01); *B01D 39/2051* (2013.01); *B22F 1/0003* (2013.01); *B22F 3/11* (2013.01); *B22F 5/10* (2013.01); *C22C 1/08* (2013.01); *C22C 33/02* (2013.01); *C22C 38/06* (2013.01); *C22C 38/18* (2013.01); *B01D 2239/1216* (2013.01); *B22F 2301/35* (2013.01)

(58) Field of Classification Search
None
See application file for complete search history.

(56) References Cited

U.S. PATENT DOCUMENTS

| | | | | | |
|---|---|---|---|---|---|
| 4,331,631 A | * | 5/1982 | Chapman | ............... | B01J 37/024 148/243 |
| 4,758,272 A | * | 7/1988 | Pierotti | .............. | B01D 39/2034 419/2 |
| 4,857,500 A | * | 8/1989 | Hitachi | ............. | B01D 53/9454 428/593 |
| 4,912,077 A | * | 3/1990 | Lachman | ........... | B01D 53/8609 502/302 |
| 5,063,029 A | * | 11/1991 | Mizuno | ................ | B01J 35/0033 219/552 |
| 5,292,485 A | * | 3/1994 | Harada | ............. | B01D 39/2034 422/180 |
| 5,884,473 A | * | 3/1999 | Noda | ................... | B01D 53/945 422/177 |
| 5,908,480 A | * | 6/1999 | Ban | .................... | B01D 39/2041 55/482 |
| 5,961,931 A | * | 10/1999 | Ban | .................... | B01D 39/2041 422/171 |
| 6,033,623 A | * | 3/2000 | Deevi | .................. | C22C 1/0491 419/29 |
| 6,287,446 B1 | * | 9/2001 | Bugnet | ............. | B01D 39/2051 205/150 |
| 6,387,149 B1 | * | 5/2002 | Harada | ................ | B22F 3/1137 419/14 |
| 6,733,575 B1 | * | 5/2004 | Lefever | ................... | B22F 3/002 110/216 |
| 2002/0053193 A1 | * | 5/2002 | Sugano | ................ | F01N 3/0226 55/498 |
| 2006/0140826 A1 | * | 6/2006 | LaBarge | ........... | B01D 53/9454 422/168 |
| 2014/0219855 A1 | * | 8/2014 | Hattendorf | ............ | C22C 38/002 420/37 |

FOREIGN PATENT DOCUMENTS

| | | |
|---|---|---|
| CN | 101439884 A | 5/2009 |
| JP | 06-239673 A | 8/1994 |
| JP | 2013-53121 A | 3/2013 |

* cited by examiner

*Primary Examiner* — Amber R Orlando
(74) *Attorney, Agent, or Firm* — Meng Ouyang

(57) ABSTRACT

Disclosed are a sintered Fe—Al based alloy porous material with high temperature oxidation resistance and a filter element using same. The porous material has a porosity of 30-60% and an average pore diameter of 0.5-50 μm, and has that: a) it mainly consists of three elements of Fe, Al and Cr, and the total weight of these three elements accounts for at least 90% of the weight of the porous material, wherein the weight of Fe is 60-85% of the total weight of Fe and Al, and the weight of Cr is 10-30% of the total weight of Fe, Al and Cr; b) the Cr in the porous material mainly presents in the form of a chromium compound of a Fe—Al based compound, or mainly presents in the form of a chromium compound of the Fe—Al based compound and FeCr, and is almost uniformly dispersed in the porous material; and c) it has a tensile strength≥45 MPa, an air flux≥80 m³/m²·KPa·h for the sintered Fe—Al based alloy porous material with a thickness≤5 mm, a weight loss rate of at most 0.5% after being immersed into a NaOH solution with a mass fraction of 10% at room temperature for 15 days, and a material weight gain rate of at most 0.25% after being kept at 1000° C. in air for 90 hours.

2 Claims, 1 Drawing Sheet

SINTERED FE—AL BASED POROUS ALLOY MATERIAL WITH HIGH-TEMPERATURE OXIDIZATION RESISTANCE AND FILTERING ELEMENTS

TECHNICAL FIELD

The present invention relates to a porous material and a filter element using same, and specifically relates to a sintered Fe—Al based alloy porous material prepared by a powder metallurgy method and a filter element using the porous material.

BACKGROUND ART

At present, the research on the sintered porous material mainly focuses on several aspects of the optimization of preparation processes, the exploration of pore-forming mechanisms, the improvement of material properties and the extension of application ranges. Among them, as for the pore-forming mechanisms, the pore-forming means applied to the method for preparing the sintered porous material mainly comprise: firstly, forming pores by chemical reactions, the mechanism of which is on the basis of the partial diffusion effect caused by the larger differences in the intrinsic diffusion coefficients of different elements, thereby resulting in generating the Kirkendall pores in the material; secondly, forming pores by the physical accumulation of raw material particles; finally, forming pores by the escape of additives. The selection and combination of the pore-forming means described above can inevitably cause the direct effect on the pore structure of the porous material. The pore structure of the porous material can further determine the properties of the porous material. Thus, the sintered porous materials generated on the basis of different pore-forming means always have different pore structures and service performances, and these porous materials can be identified and characterized more clearly by understanding and measuring the pore structures and the service performances. At present, in order to adequately characterize the porous materials, it is usually adopted in the art of: 1) compositions and content of the raw material; 2) pore structures, mainly comprising porosity, pore diameter and so on; 3) material property parameters, comprising permeability, mechanical strength and chemical stability, wherein, the permeability is usually measured by a fluid permeation method, the mechanical strength is usually represented by tensile strength, and the chemical stability is mainly represented by acid resistance and/or alkali resistance.

A Fe—Al intermetallic compound porous material is a sintered inorganic porous material between high temperature alloys and ceramics. It is bonded together by metallic bonds and covalent bonds, and has common advantages of both metal materials and ceramic materials; thus, the Fe—Al intermetallic compound porous material has a broad application prospect as a filter material (in particular, as a high temperature gas filter material). It is generally acknowledged that the Fe—Al intermetallic compound porous material has excellent properties; however, for some special application fields, the high temperature oxidation resistance property and the strong alkali corrosion resistance of the Fe—Al intermetallic compound porous material still need to be improved. Before the filing date of the present application, the sintered Fe—Al based alloy porous material, which can improve the high temperature oxidation resistance property and the strong alkali corrosion resistance property of the Fe—Al intermetallic compound porous material, and in the meantime also can improve the pore structure of the material additionally and achieve good comprehensive service performances, has not been discovered.

SUMMARY OF THE INVENTION

The technical problem to be solved by the present application is providing a sintered Fe—Al based alloy porous material with high temperature oxidation resistance and a filter element using same.

The sintered Fe—Al based alloy porous material with high temperature oxidation resistance of the present application has a porosity of 30-60% and an average pore diameter of 0.5-50 μm, and has the following features:

a) it mainly consists of three elements of Fe, Al and Cr, and the total weight of these three elements accounts for at least 90% of the weight of the sintered Fe—Al based alloy porous material, wherein the weight of Fe is 60-85% of the total weight of Fe and Al, and the weight of Cr is 10-30% of the total weight of Fe, Al and Cr;

b) the Cr in the sintered Fe—Al based alloy porous material mainly presents in the form of a chromium compound of a Fe—Al based compound, or mainly presents in the form of a chromium compound of the Fe—Al based compound and FeCr, and is almost uniformly dispersed in the sintered Fe—Al based alloy porous material;

and c) it has a tensile strength≤45 MPa, an air flux≥80 $m^3/m^2 \cdot KPa \cdot h$ for the sintered Fe—Al based alloy porous material with a thickness≤5 mm, a weight loss rate of at most 0.5% after being immersed into a NaOH solution with a mass fraction of 10% at room temperature for 15 days, and a material weight gain rate of at most 0.25% after being kept at 1000° C. in air for 90 hours.

The sintered Fe—Al based alloy porous material stated above can only consist of three elements of Fe, Al and Cr, and can also be added with other substance in addition to Fe, Al and Cr, such as one or more elements of Mo, V, Nb, Si, W, Y, Ta, Zr and Co, within the range of up to 10% of the total weight of the sintered Fe—Al based alloy porous material. At present, it is suggested that the total weight of the three elements of Fe, Al and Cr can be controlled at least 95%, 97%, 98% or 99% of the weight of the porous material, thereby ensuring the properties of the sintered Fe—Al based alloy porous material, in the meantime, simplifying the kinds of raw materials and facilitating the production.

When the sintered Fe—Al based alloy porous material consists of three elements of Fe, Al and Cr, according to the variation of the Cr content, the compositions of the crystalline phase in the sintered Fe—Al based alloy porous material may comprise the following cases:

1) the crystalline phase of the sintered Fe—Al based alloy porous material consists of a Fe—Al binary intermetallic compound and a Fe—Al—Cr ternary compound, and the said Fe—Al—Cr ternary compound specifically is $Fe_2AlCr$;

2) the crystalline phase of the sintered Fe—Al based alloy porous material consists of a Fe—Al—Cr ternary compound, and the said Fe—Al—Cr ternary compound specifically is $Fe_2AlCr$;

3) the crystalline phase of the sintered Fe—Al based alloy porous material consists of a Fe—Cr binary compound and a Fe—Al—Cr ternary compound, the said Fe—Al—Cr ternary compound specifically is $Fe_2AlCr$, and the Fe—Cr binary compound specifically is FeCr.

The filter element of the present application, wherein the filter element includes the sintered Fe—Al based alloy porous material with high temperature oxidation resistance stated above. In light of the material properties, said filter element is most preferred to be one filter element for filtering gas, especially to be one filter element for filtering high temperature gas of 300-800° C.

The method for preparing the sintered Fe—Al based alloy porous material with high temperature oxidation resistance stated above of the present application, wherein the steps of the method comprise:

1) preparing a mixed powder material: mixing the Fe powder with a particle size of 200-300 mesh, the Al powder with a particle size of 200-300 mesh and the Cr powder with a particle size of −400 mesh according to the proportion of that, in the prepared sintered Fe—Al based alloy porous material, Fe is 60-85% of the total weight of Fe and Al, and Cr is 10-30% of the total weight of Fe, Al and Cr;

2) granulating, drying and molding: successively granulating and drying the mixed powder material containing the Fe powder, Al powder and Cr powder stated above, setting the drying temperature of 40-60° C., setting the drying time of 4-8 hours, then performing compression molding, that is, keeping the molding pressure 120-280 MPa, and obtaining a compact after the compression molding; and 3) sintering: placing the compact into a sintering furnace for sintering, wherein the sintering schedule includes the following four stages: the first stage: raising the sintering temperature from room temperature to 420-500° C. with a temperature rising rate controlled at 1-10° C./min, and keeping temperature at 420-500° C. for 60-300 minutes; the second stage: raising the sintering temperature to 550-650° C. with a temperature rising rate controlled at 1-10° C./min, and keeping temperature at 550-650° C. for 180-360 minutes; the third stage: raising the sintering temperature to 1000-1100° C. with a temperature rising rate controlled at 1-15° C./min, and keeping temperature at 1000-1100° C. for 120-240 minutes; and the fourth stage: raising the sintering temperature to 1200-1350° C. with a temperature rising rate controlled at 1-5° C./min, and keeping temperature at 1200-1350° C. for 120-360 minutes; furnace cooling after sintering, and then obtaining the sintered Fe—Al based alloy porous material with high temperature oxidation resistance.

The sintered Fe—Al based alloy porous material with high temperature oxidation resistance of the present application has the following beneficial technical effects:

1) the porous material has higher tensile strength, and excellent high temperature oxidation resistance and strong alkali corrosion resistance;

2) surprisingly, because of the reaction between the Cr and Fe in the raw materials, the pore structures are improved, the permeation resistance of the filter media decreases, and the desired filtration flux (permeability) can be obtained.

DETAILED EMBODIMENTS

Figure 1:
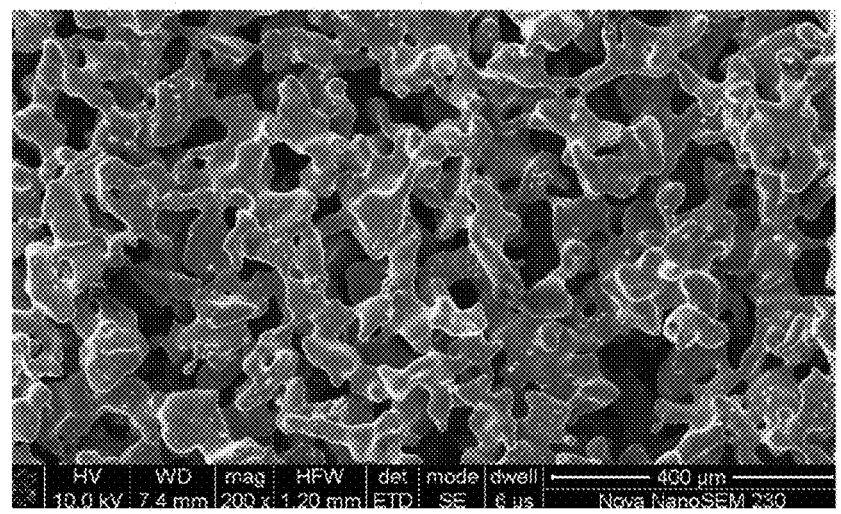
FIG. 1 is a SEM (scanning electron microscope) image of the sample 1 in the detailed embodiments of the present application.

Hereinafter, the methods for preparing the sintered Fe—Al based alloy porous material and the sintered Fe—Al based alloy porous material obtained by these methods are described in detail through experiments. Through these descriptions, a person skilled in the art can clearly understand the prominent features of the sintered Fe—Al based alloy porous material of the present application. The numbers of experimental examples referred to hereinafter are in accordance with the numbers of the corresponding "compacts" and "samples".

Seven experimental examples as following are prepared in order to describe the sintered Fe—Al based alloy porous material of the present application and the method for preparing same. Among them, Samples 1 to 4 prepared by Experimental Examples 1 to 4 respectively are within the scope of the sintered Fe—Al based alloy porous material set forth in claim 1 of the present application. Experimental Examples 5 to 7 are the comparison experiments for illustrating the substantive features and technical effects of Experimental Examples 1 to 4, and "*"s are marked on the numbers of Experimental Examples 5 to 7 for distinguishing. Experimental Example 5 specifically decreases the content of the Cr powder in the raw materials as compared to Experimental Example 1, and Sample 5 prepared therefrom and Sample 1 are compared. Experimental Example 6 specifically increases the content of the Cr powder in the raw materials as compared to Experimental Example 4, and Sample 6 prepared therefrom and Sample 3 are compared. Experimental Example 7 relates to an existing method for preparing the Fe—Al intermetallic compound porous material, and Sample 7 prepared therefrom and Samples 1 to 4 are compared.

1 Material Preparing Process

The components and content (by weight percentage) of the raw materials of Experimental Examples 1 to 7 are shown in Table 1. Among them, the Fe powder with a particle size of 200-300 mesh, the Al powder with a particle size of 200-300 mesh, the Cr powder with a particle size of −400 mesh and the Si powder with a particle size of 3-5 μm are adopted.

According to the components and content of the raw materials listed in Table 1, it shows that: the raw materials of Experimental Example 1 consist of the Fe powder, Al powder and Cr powder, wherein, the Fe powder accounts for 75% of the total weight of the Fe powder and Al powder, and the Cr powder accounts for 10% of the total weight of the raw materials; the raw materials of Experimental Example 2 consist of the Fe powder, Al powder and Cr powder, wherein, the Fe powder accounts for 77.5% of the total weight of the Fe powder and Al powder, and the Cr powder accounts for 26.5% of the total weight of the raw materials; the raw materials of Experimental Example 3 consist of the Fe powder, Al powder and Cr powder, wherein, the Fe powder accounts for 75% of the total weight of the Fe powder and Al powder, and the Cr powder accounts for 30% of the total weight of the raw materials; the raw materials of Experimental Example 4 consist of the Fe powder, Al powder, Cr powder and Si powder, wherein, the Fe powder accounts for 75% of the total weight of the Fe powder and Al powder, the Cr powder accounts for 9.4% the total weight of the raw materials, and the Si powder accounts for 6% of the total weight of the raw materials; the raw materials of Experimental Example 5 consist of the Fe powder, Al powder and Cr powder, wherein, the Fe powder accounts for 75%6 of the total weight of the Fe powder and Al powder, and the Cr powder accounts for 5% of the total weight of the raw materials; the raw materials of Experimental Example 6 consist of the Fe powder, Al powder and Cr powder, wherein, the Fe powder accounts for 75% of the total weight of the Fe powder and Al powder, and the Cr powder accounts for 35% of the total weight of the raw materials; and the raw materials of Experimental Example 7 consist of the Fe powder and Al powder, wherein, the Fe powder accounts for 75% of the total weight of the Fe powder and Al powder.

TABLE 1

The components and content of the raw materials adopted in Experimental Examples 1 to 7

| | The components and content of the raw materials | | | |
|---|---|---|---|---|
| Experiment Number | Fe powder (elementary substance) | Al powder (elementary substance) | Cr powder (elementary substance) | Others |
| 1 | 67.50% | 22.50% | 10.0% | None |
| 2 | 57.00% | 16.50% | 26.5% | None |
| 3 | 52.50% | 17.50% | 30.0% | None |
| 4 | 63.45% | 21.15% | 9.4% | Si powder (the rest) |
| 5* | 71.25% | 23.75% | 5.0% | None |
| 6* | 48.75% | 16.25% | 35.0% | None |
| 7* | 75.00% | 25.00% | None | None |

The raw materials of Experimental Examples 1 to 7 are mixed respectively according to that listed in Table 1. After thoroughly mixing, it is considered that the Cr powder with the smaller particle size is doped in the raw materials of Experimental Examples 1 to 6, and segregation is easily caused; thus, it further needs to granulate the powder materials of Experimental Examples 1 to 6 (for facilitating comparison, granulating the powder materials of Experimental Example 7 in the same way) and perform drying after the granulation, wherein the drying temperature is set to 55° C., and the drying time is set to 6 hours. Next, the powder materials of Experimental Examples 1 to 7 are respectively filled into isostatic pressing forming molds with a unified specification. Then, these molds are respectively positioned in a cold isostatic pressing molding machine and kept under a molding pressure of 200 MPa for 60 seconds, and then the tubular compacts with numbers 1 to 7 are prepared after demolding. Next, these compacts are filled into sintering boats. Then, these sintering boats are positioned into a sintering furnace for sintering, and cooled with the furnace after sintering. Finally, the samples 1 to 7 are taken out from each sintering boat.

1.1 The Sintering Schedule of Experimental Examples 1 to 6

The sintering schedule of Experimental Examples 1 to 6 includes the following four stages. The first stage: the sintering temperature is raised from room temperature to 420-500° C., the temperature rising rate is controlled at 1-10° C./min, and the temperature is kept at 420-500° C. for 60-300 minutes; the second stage: the sintering temperature is raised to 550-650° C., the temperature rising rate is controlled at 1-10° C./min, and the temperature is kept at 550-650° C. for 180-360 minutes; the third stage: the sintering temperature is raised to 1000-1100° C., the temperature rising rate is controlled at 1-15° C./min, and the temperature is kept at 1000-1100° C. for 120-240 minutes; and the fourth stage: the sintering temperature is raised to 1200-1350° C., the temperature rising rate is controlled at 1-5° C./min, and the temperature is kept at 1200-1350° C. for 120-360 minutes. The sintered Fe—Al based alloy porous material with high temperature oxidation resistance is just obtained by furnace cooling after sintering.

The main purpose of the first stage stated above is to degrease. The second stage is a medium temperature reaction stage, and the main purpose of the second stage is to promote generating the Fe—Al binary intermetallic compound and forming pores through the reaction between Fe and Al, and to promote generating the FeCr and forming pores through the reaction between Fe and Cr along with generating the Fe—Al—Cr ternary compound $Fe_2AlCr$ through the reaction between the Fe—Al binary intermetallic compound and the FeCr in the meantime. The third stage is a high temperature reaction stage, and the main purpose of the third stage is further to promote reacting and generating $Fe_2AlCr$. The fourth stage is a temperature-keeping stage, and the main purpose of the fourth stage is to sinter sufficiently and to promote the homogenization of the structure and the improvement of the properties. In order to inhibit the volatilization of light weight elements in the high temperature stage, inert gas can be adopted in the third and fourth stages stated above for protective sintering, or the proportion of the raw materials can be appropriately adjusted so as to compensate for the volatilization amounts of the light weight elements.

The sintering process parameters of the four stages in the sintering processes of Experimental Examples 1 to 6 are shown in Table 2 in detail. In Table 2, the unit of temperature rising rate is ° C./min, and the unit of sintering time is minute.

TABLE 2 the sintering schedules of Experimental Examples 1 to 6

| | The first stage | | | The second stage | | | The third stage | | | The fourth stage | | |
|---|---|---|---|---|---|---|---|---|---|---|---|---|
| Experiment Number | Temperature rising rate | Raising temperature to (° C.) | Temperature-keeping rate | Temperature rising rate | Raising temperature to (° C.) | Temperature-keeping rate | Temperature rising rate | Raising temperature to (° C.) | Temperature-keeping rate | Temperature rising rate | Raising temperature to (° C.) | Temperature-keeping rate |
| 1 | 5 | 500 | 60 | 3 | 630 | 240 | 6 | 1100 | 120 | 2 | 1350 | 120 |
| 2 | 5 | 500 | 60 | 3 | 630 | 240 | 6 | 1100 | 120 | 2 | 1350 | 120 |
| 3 | 5 | 500 | 60 | 3 | 630 | 300 | 6 | 1100 | 120 | 2 | 1350 | 120 |
| 4 | 5 | 500 | 60 | 3 | 550 | 300 | 6 | 1100 | 120 | 2 | 1250 | 180 |
| 5* | 5 | 500 | 60 | 3 | 630 | 240 | 6 | 1100 | 120 | 2 | 1350 | 120 |
| 6* | 5 | 500 | 60 | 3 | 630 | 300 | 6 | 1100 | 180 | 2 | 1350 | 120 |

1.2 The Sintering Schedule of Experimental Examples 7

The sintering schedule includes three stages. The sintering temperature is raised from room temperature to 500° C., the temperature rising rate is controlled at 5° C./min, and the temperature is kept at 500° C. for 60 minutes; the second stage: the sintering temperature is raised to 630° C., the temperature rising rate is controlled at 3° C./min, and the temperature is kept at 630° C. for 300 minutes; and the third stage: the sintering temperature is raised to 1100° C., the temperature rising rate is controlled at 5° C./min, and the temperature is kept at 1100° C. for 120 minutes. The sintered Fe—Al based alloy porous material is just obtained by furnace cooling after sintering.

2 The Phase Compositions and the Property Measurements of the Materials

Figure 2:
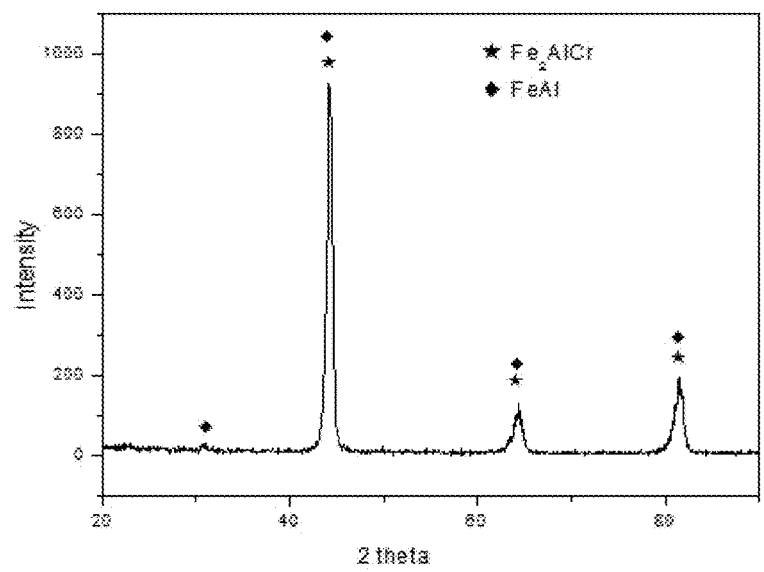
FIG. 2 is a XRD (X-ray diffraction) image of the sample 1 in the detailed embodiments of the present application.

Samples 1 to 7 are tested by XRD respectively, and the results are as following: the phase composition of Sample 1 is the Fe—Al binary intermetallic compound (FeAl) and the $Fe_2AlCr$ (as shown in FIG. 2); the phase composition of Sample 2 is $Fe_2AlCr$; the phase composition of Sample 3 is $Fe_2AlCr$ and FeCr; the phase composition of Sample 4 is the Fe—Al binary intermetallic compound, $Fe_2AlCr$ and $Fe_3Si$; the phase composition of Sample 5 is the Fe—Al binary intermetallic compound and $Fe_2AlCr$; the phase composition of Sample 6 is $Fe_2AlCr$ and FeCr; and the phase composition of Sample 7 is the Fe—Al binary intermetallic compound.

It shows that the phase compositions of the sintered Fe—Al based alloy porous materials of the present application are relevant to the Cr content. In the case of that no additional element is doped, when the Cr content is relatively less, the crystalline phase of the sintered Fe—Al based alloy porous material consists of the Fe—Al binary intermetallic compound and the $Fe_2AlCr$ (as the sample 1); when the Cr content is increased to a certain extent, the crystalline phase of the sintered Fe—Al based alloy porous material consists of the $Fe_2AlCr$ (as the sample 2); and when the Cr content is further increased, the crystalline phase of the sintered Fe—Al based alloy porous material consists of the $Fe_2AlCr$ and FeCr (as the sample 3). The Fe—Al binary intermetallic compound can be $Fe_3Al$ and FeAl according to the ratio of the raw materials.

The properties tests of Samples 1 to 7 are shown in Table 3. Among them, the bubbling method is adopted for the measurements of the porosity and the average pore diameter of the materials; specifically, the filtration flux is an air flux under a filtration pressure difference of 1 KPa on a filtering area of 1 square meter for 1 hour; the tests for the tensile strength of the materials are performed by machining Samples 1 to 7 to standard samples according to the Chinese National Standard GB7963-87 and then measuring the samples through a tensile machine; the corrosion resistance of the materials is characterized by the weight loss rate after being immersed into a NaOH solution with a mass fraction of 10% at room temperature for 15 days; and the high temperature oxidation resistance properties of the materials are characterized by the weight gain rates of the materials after being kept at 1000° C. in air atmosphere for 90 hours.

3 Analysis of the Test Results

1) The general test results are shown in Table 3. Among them, Samples 1 to 4 have a tensile strength≥45 MPa, an air flux≥80 $m^3/m^2 \cdot kpa \cdot h$ for the sintered Fe—Al based alloy porous material with a thickness of about 5 mm (obviously, on the basis of this, the thinner the thickness, the larger the flux), a weight loss rate of at most 0.5% after being immersed into a NaOH solution with a mass fraction of 10% at room temperature for 15 days, and a material weight gain rate of at most 0.25% after being kept at 1000° C. in air atmosphere for 90 hours. Moreover, both of Samples 5 and 7 cannot arrive at the following parameters at the same time: a tensile strength≥45 MPa, an air flux≥80 $m^3/m^2 \cdot KPa \cdot h$, a weight loss rate of at most 0.5% after being immersed into a NaOH solution with a mass fraction of 10% at room temperature for 15 days, and a material weight gain rate of at most 0.25% after being kept at 1000° C. in air atmosphere for 90 hours.

2) As for the tensile strength, corrosion resistance and high temperature oxidation resistance of the materials. The tensile strength of Samples 1 and 4 is 48 MPa and 55 MPa respectively, and approaches the lower limit of 45 MPa; and the tensile strength of Samples 2, 3 and 6 significantly increases and reaches to at least 60 MPa. The corrosion resistance and high temperature oxidation resistance of Samples 1 and 4 are lower than those of Samples 2, 3 and 6. It shows that, when the contents of Fe and Al are determined, the tensile strength, corrosion resistance and high temperature oxidation resistance of the materials are relevant to the Cr content, that is, if the Cr content increase, the tensile strength, corrosion resistance and high temperature oxidation resistance are increased correspondingly. Sample 7 does not include Cr, thus the tensile strength, corrosion resistance and high temperature oxidation resistance of Sample 7 are the lowest. The Cr content is less in Sample 5, thus the tensile strength thereof is higher than that of Sample 7, but is less than 45 MPa; and the corrosion resistance and high temperature oxidation resistance of Sample 5 are not very desirable.

3) As for the permeability of the materials. In Samples 1 to 7, except that the air fluxes of Sample 2, 3 and 4 are significantly higher, the air fluxes of the rest samples approach to each other. Moreover, in view of the variation of the air fluxes of Samples 1 to 6, in the case of that the porosity and the average pore diameter are substantially similar, when the weight of Cr is at most 30% of the total weight of Fe, Al and Cr, the air flux gradually increases with the increase of the Cr content, but when the Cr content

TABLE 3 the property test results of Samples 1 to 7

| | | | | Test items | | | |
|---|---|---|---|---|---|---|---|
| Sample Number | Thickness (mm) | Porosity (%) | Average pore diameter (μm) | Tensile strength (MPa) | Filtration flux ($m^3/m^2kpah$) | Corrosion resistance (weight loss rate %) | High temperature oxidation resistance property |
| 1 | 5.1 | 54 | 5.3 | 48 | 85 | 0.43 | 0.23 |
| 2 | 5.0 | 52 | 5.1 | 60 | 91 | 0.38 | 0.13 |
| 3 | 5.2 | 50 | 5.6 | 62 | 92 | 0.37 | 0.12 |
| 4 | 5.0 | 51 | 5.3 | 55 | 94 | 0.42 | 0.19 |
| 5* | 4.8 | 55 | 5.2 | 41 | 85 | 0.87 | 0.65 |
| 6* | 4.9 | 49 | 5.6 | 62 | 79 | 0.37 | 0.11 |
| 7* | 5.0 | 53 | 5.5 | 40 | 83 | 2.53 | 1.64 | exceeds 30% (as Sample 6), the air flux begins to decrease. It shows that, when the doping amount of Cr is at most 30% of the total weight of Fe, Al and Cr, the Cr and Fe in the raw materials reacts; thus, the pore structure is improved, the effect of the decrease of the Al content on the pore-forming and the porosity can be compensated, the permeation resistance of the filter media is decreased, and the desirable filtration flux can be obtained.

4) In general, in order to achieve more excellent comprehensive service performances, in the sintered Fe—Al based alloy porous material of the present application, Fe can account for 70%, 73%, 76% or 80% of the total weight of Fe and Al, and in the sintered Fe—Al based alloy porous material, Cr can account for 20%, 24%, 26% or 28% of the total weight of Fe, Al and Cr. In light of that the high temperature oxidation resistance of these sintered Fe—Al based alloy porous materials are significantly improved as compared with common Fe—Al intermetallic compound porous materials, therefore, the sintered Fe—Al based alloy porous material of the present application is extremely applicable for manufacturing filter elements for filtering gas, especially for manufacturing filter elements for filtering high temperature gas of 300-800° C.

The invention claimed is:

1. A method for preparing sintered Fe—Al based alloy porous material with high temperature oxidation resistance; comprising:
   1) preparing a mixed powder material by mixing Fe powder with a particle size of 200-300 mesh, Al powder with a particle size of 200-300 mesh and Cr powder with a particle size of −400 mesh, wherein in the sintered Fe—Al based alloy porous material having a porosity of 30-60% and an average pore diameter of 0.5-50 µm, Fe is 60-85% of the total weight of Fe and Al, and Cr is 10-30% of the total weight of Fe, Al and Cr;
   2) granulating the mixed powder material;
   3) drying the mixed powder material at 40-60° C. for 4-8 hours;
   4) molding the mixed powder material under pressure at 0-280 MPa to result into a compact; and
   5) sintering the compact by placing the compact into a sintering furnace, wherein the sintering schedule comprises four steps:
      i) raising the sintering temperature from room temperature to 420-500° C. with a temperature rising rate controlled at 1-10° C./min, and keeping temperature at 420-500° C. for 60-300 minutes;
      ii) raising the sintering temperature to 550-650° C. with a temperature rising rate controlled at 1-10° C./min, and keeping temperature at 550-650° C. for 180-360 minutes;
      iii) raising the sintering temperature to 1000-1100° C. with a temperature rising rate controlled at 1-15° C./min, and keeping temperature at 1000-1100° C. for 120-240 minutes; and
      iv) raising the sintering temperature to 1200-1350° C. with a temperature rising rate controlled at 1-5° C./min, and keeping temperature at 1200-1350° C. for 120-360 minutes; furnace cooling after sintering, and then obtaining the sintered Fe—Al based alloy porous material with high temperature oxidation resistance.

2. The method of claim 1, in which the preparing a mixed powder material, wherein in the sintered based alloy porous material, Fe is 70-80% of the total weight of Fe and Al, and Cr is 20-28% of the total weight of Fe, Al and Cr.

* * * * *